Jan. 31, 1956  E. F. DOOLEY ET AL  2,733,109
UTILITY TRAY MECHANISM FOR AUTOMOBILES OR THE LIKE
Filed Aug. 14, 1952  2 Sheets-Sheet 2
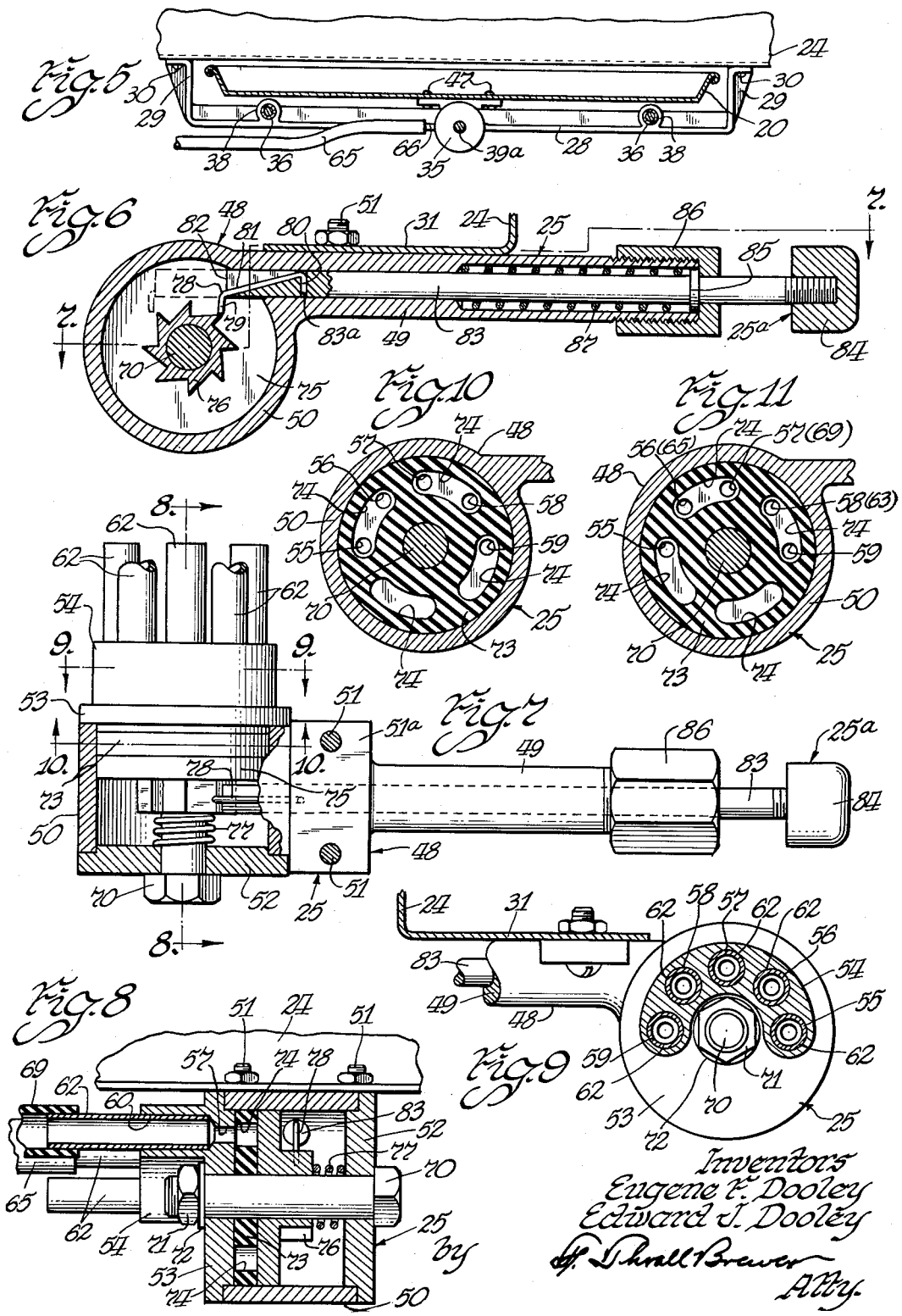
Inventors
Eugene F. Dooley
Edward J. Dooley

# United States Patent Office 2,733,109
Patented Jan. 31, 1956

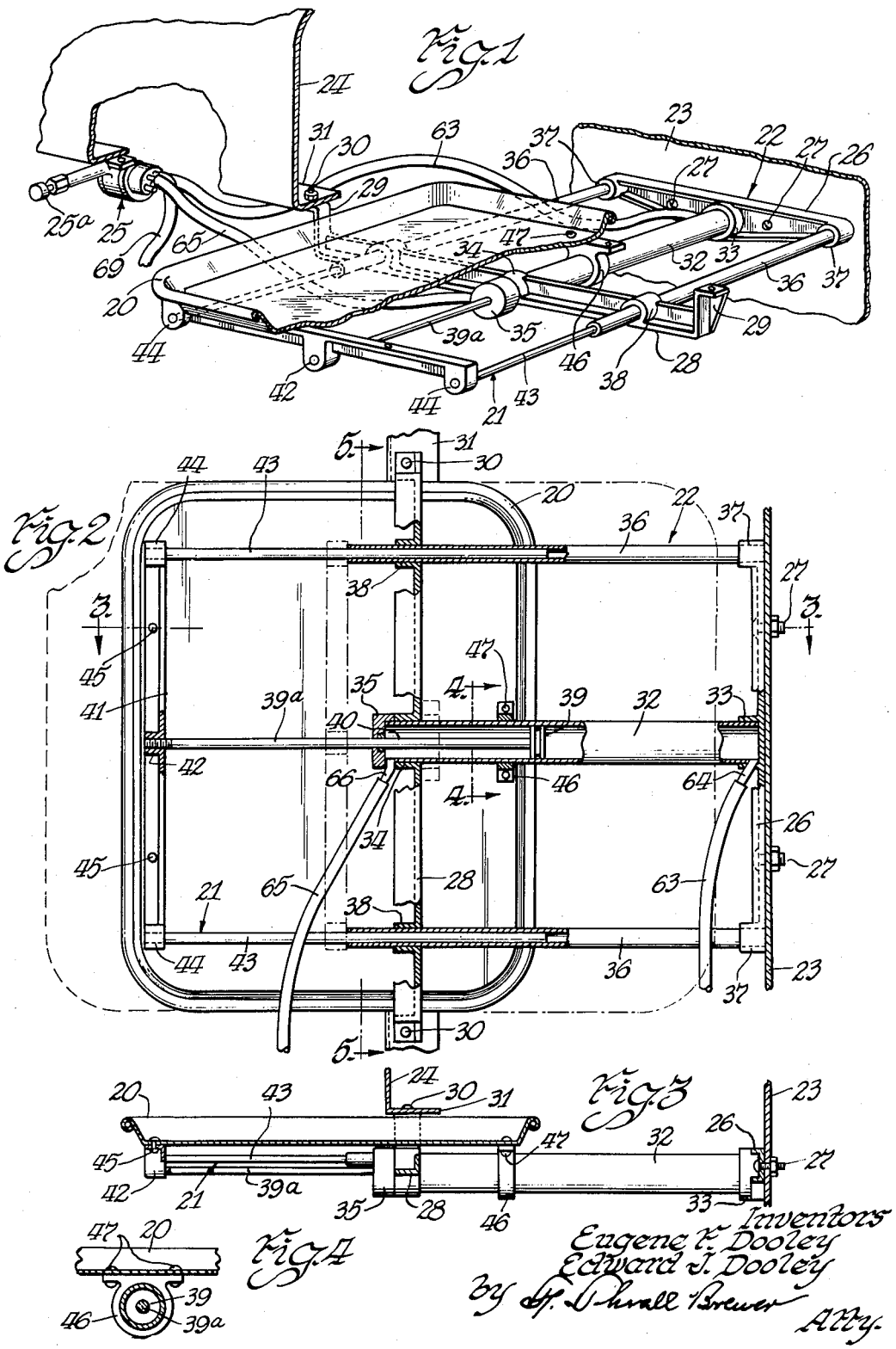

2,733,109

UTILITY TRAY MECHANISM FOR AUTOMOBILES OR THE LIKE

Eugene F. Dooley, Peoria, and Edward J. Dooley, East Peoria, Ill.

Application August 14, 1952, Serial No. 304,284

3 Claims. (Cl. 311—21)

This invention relates to an adjustable mounting for a tray or shelf. More specifically, it relates to a mounting for a serving tray in the passenger compartment of an automotive vehicle.

An object of this invention is to provide a tray or shelf readily movable between an operative position in which it protrudes from a support and an inoperative position in which it is retracted relative to the support. Our tray or shelf is particularly adaptable to use in association with the instrument panel of an automotive vehicle for carrying food or refreshments, or for holding various items when desired for the purpose. When not in use, the tray is retracted to an out-of-the-way position, such as beneath the instrument panel. In such an instance, the apparatus for supporting and shifting the tray between its operative and inoperative positions may be mounted on the instrument panel and the fire wall of the automotive vehicle.

As another object, our invention has within its purview the provision of a piston-and-cylinder assembly in an apparatus for supporting a tray so that the tray may be shifted between an operative protruding position and a retracted out-of-the-way position. In this embodiment of our invention, the tray is mounted adjacent the instrument panel of an automotive vehicle, and the actuation is effected by atmospheric pressure acting in conjunction with reduced pressure obtained from the vacuum system of the vehicle.

The invention comprehends, as another object, the provision of a valve and actuator assembly suited to use with a piston-and-cylinder tray actuating mechanism for reversing the application of operating force to the tray in order to shift the tray between projecting and retracted positions relative to a support. The valve and actuator assembly is so constructed and arranged that successive movements or actuations of the actuator will effect shifting movements of the piston in alternate directions. In the disclosed embodiment of this invention, the valve and actuator assembly is employed to advantage for reversing the application of atmospheric and reduced pressures to a piston, in order to make it shift a tray between positions in which it either protrudes from, or is retracted beneath a vehicle instrument panel.

Other objects and advantages of the invention will be apparent from the following description and the accompanying drawings in which similar characters of reference indicate similar parts throughout the several views.

Referring to the two sheets of drawings:

Fig. 1 is a perspective view, with certain parts broken away, illustrating the apparatus of our invention in a preferred application to the mounting and shifting of a tray between projecting and retracted positions relative to the instrumental panel of an automotive vehicle;

Fig. 2 is a bottom plan view of parts of the apparatus shown in Fig. 1, with certain elements broken away and in section to indicate preferred details of structure;

Fig. 3 is a longitudinal side sectional view taken substantially on a line 3—3 of Fig. 2, and in the direction of the arrows;

Fig. 4 is an end sectional view of a portion of the apparatus taken substantially on a line 4—4 of Fig. 2, and in the direction of the arrows;

Fig. 5 is an end sectional view of the apparatus taken substantially on a line 5—5 of Fig. 2, and in the direction of the arrows;

Fig. 6 is a longitudinal vertical sectional view through a preferred valve and actuator assembly by which the disclosed apparatus is controlled;

Fig. 7 is a top plan view, partly in section, of the valve and actuator assembly taken substantially as indicated by line 7—7 in Fig. 6 and the accompanying arrows;

Fig. 8 is a sectional view of the valve assembly taken substantially on a line 8—8 of Fig. 7, and in the direction of the arrows;

Fig. 9 is a view, partly in section, of the valve and actuator assembly, taken substantially on a line 9—9 of Fig. 7, and in the direction of the arrows; and Figs. 10 and 11 are sectional views of valve assembly taken substantially on a line 10—10 of Fig. 7, in the direction of the arrows, and showing different operating positions of the parts.

Having reference to the drawings, wherein a preferred embodiment of invention is shown for illustrative purposes, a tray 20 is secured to a movable frame 21 which is mounted on a stationary frame 22 for linear shifting movement between extended and retracted positions. The stationary frame, in the disclosed embodiment, has one end secured to a fire wall 23 which separates the engine and passenger compartments of an automotive vehicle, and its other end secured to an instrument panel 24 located in the passenger compartment. Movements of the tray 20 are initiated by manual operation of an actuator 25a of a valve assembly constructed and arranged so that by successive actuations, the tray is moved between a position in which it protrudes from the instrument panel and a position in which it lies retracted beneath the instrument panel.

The stationary frame 22 includes a bracket 26 which is secured to the fire wall 23 by bolts 27, and a bracket 28 which has upturned ends 29 which are secured by bolts 30 to a flange 31 on the instrument panel 24. The stationary frame 22 also includes a cylinder 32, which has one end mounted in a socket 33 in bracket 27 and the other end mounted in a collar 34 on the bracket 28. The latter end of the cylinder is closed by a cap 35. Tubular guides 36 are provided on opposite sides of the cylinder 32 and have their ends suitably secured as by soldering, welding, or press-fitting, in portions 37 of the fire wall bracket 26 adjacent the ends thereof, and in collar portions 38 somewhat spaced from the ends of the instrument panel bracket 28. The tubular guides 36 lie substantially parallel to the cylinder 32 and are approximately equally spaced therefrom. The ends of the tubular guides 36, in the disclosed structure, also protrude beyond the portions 38 in the instrument panel bracket 28 to limit movements of the tray toward the fire wall.

The movable frame 21 includes a piston 39 which is slidably mounted in the cylinder 32 and secured to a piston rod 39a, which piston rod protrudes through and beyond the cap 35. The piston rod is sealed by packing 40 in the cap 35, as shown in Fig. 2. The movable frame 21 also comprises a transverse support 41 which has a central collar portion 42 in which the protruding end of the piston rod 39a is secured by threaded engagement therewith. Rods 43 are secured to end portions 44 of the transverse support 41 and are slidably mounted for linear movements in the tubular guides 36. Fastening means, such as rivets 45, secure spaced regions of one side, or long end, of the tray 20 to the transverse support 41. The other side or long end of the tray 20 is supported for sliding movement relative to the cylinder 32 by a bearing member 46 which is secured to the tray by rivets 47 and encompasses the cylinder 32.

The disclosed valve assembly 25, as depicted in Figs. 6 to 11 inclusive, includes a housing 48 which comprises a tubular portion 49 and an enlarged hollow circular portion 50. The housing 48, in the present instance, is secured to the instrument panel flange 31 by fastening means, such as bolts 51 which pass through a flange 51a on the housing 48. Caps 52 and 53 are mounted at the opposite ends of the hollow circular portions 50 of the housing. The cap 53 has a semi-circular extension 54 integrally formed thereon which has passages 55, 56, 57, 58 and 59 which extend through the cap 53 and its extension 54 and are arranged in a semi-circle, as shown in Fig. 9. Each of the aforesaid passages has an enlarged portion 60, as shown in Fig. 8, and a shoulder 61 internally thereof. A relatively short metal tube 62 is mounted in the enlarged portion 60 of each passage with one end projecting therefrom and its other end engaging the shoulder 61.

A flexible conduit or hose 63 connects the tube 62 in the passage 56 to a tube 64 mounted in the socket 33 in the fire wall bracket 27 and the adjacent end of the cylinder 32. A flexible conduit or hose 65 connects the tube 62 in the passage 58 to a tube 66 mounted in the cap 35 and communicating with the end of the cylinder 32 at the instrument panel bracket 28. A flexible conduit or hose 69 connects the tube 62 in the passage 57 and a suitable source of vacuum, not shown, such as the intake line of the engine of the automotive vehicle. The passages 55 and 59 are open to atmospheric pressure.

The caps 52 and 53 are secured to the hollow circular portion 50 of the housing 48 by a bolt 70 and a nut 71. A washer 72 lies between the nut 71 and the cap 53. Mounted on the bolt 70 within the hollow circular interior of the housing portion 50 is a disc 73 having four arcuate slots 74 equally spaced from one another and each somewhat more than 45 degrees in arcuate length. The disc 73 is made of a material such as leather or synthetic rubber which withstands wear and provides sealing contacts around the slots. Also mounted upon the bolt 70 is a rotor 75 having thereon a toothed ratchet 76. The disc 73 and the rotor 75 are secured to one another for conjoint rotational movement about the bolt 70 and may be considered a movable valve part that cooperates with a stationary valve part, namely, the cap 53. With the rotor and plate secured jointly to form a movable valve part, the slots 74 in the disc constitute passages or channels in the movable valve part for the flow of air between connected passages in the cap. A coil spring 77 which is mounted on the bolt 70 between the rotor 75 and the cap 52 urges the disc 73 against the cap 53 to maintain sealing contact therebetween.

As shown in Fig. 6, a resilient pawl 78 is provided which has a head portion 79, a tail portion 80, and a body portion 81. The head portion is engageable with the ratchet teeth 76; the body portion is positioned in an inclined longitudinal slot 82 in a rod 83 that comprises a part of the valve actuator 25a; and the tail portion 80 of the pawl fits in a lateral opening 83a in the rod adjacent the slot. A button 84 is secured by threaded engagement to the exposed end of the rod 83 away from the pawl 78. The rod has a shoulder 85 which engages a retaining nut 86 threaded onto the end of the tubular portion 49 of the housing 48 to limit movement of the rod outwardly of the tubular portion. A coiled compression spring 87 (Fig. 6) on the rod 83 acts against the shoulder 85 on the rod and against the interior of the tubular housing portion to urge the shoulder 85 against the interior of the retaining nut.

Figs. 1, 2 and 3 show the tray 20 in an intermediate position between an extreme extended position in which the tray protrudes farther from the instrument panel 24 than shown; the extreme protruding or extended position being determined by engagement of the bearing member 47, secured to the under side of the tray, with the instrument panel bracket 28, and the extreme retracted position being determined by engagement of the transverse support 41 with the cap 35 on the instrument panel bracket 28. The tray 20 is shifted to its protruding and useable position by application of vacuum to the instrument panel end of the cylinder 32, or the left end, as viewed in Fig. 2, and by application of atmospheric air to the firewall end of the cylinder, or the right end as viewed in Fig. 2. Extension of the tray is achieved by placing the movable valve part 73, 75 in the position of Fig. 10, in which the instrument panel end of the cylinder 32 is exposed to low pressure through vacuum hose 69, passage 57, one disc slot 74, passage 58, and cylinder hose 65, in which instance atmospheric air is supplied to the firewall end of the cylinder through passage 55, another disc slot 74, passage 56, and cylinder line 63. When the tray 20 is to be shifted to its retracted position beneath the instrument panel 24, the application of low pressure and atmospheric air to the cylinder 32 is reversed; that is, atmospheric air is supplied to the instrument panel end of the cylinder 32, and low pressure is applied to the firewall end of the cylinder. This shift requires a 45 degree movement of the movable valve part 73, 75 to the position of Fig. 11, in which low pressure is applied to the firewall end of the cylinder 32 through vacuum line 69, one disc slot 74, passage 56, and cylinder line 63, and atmospheric air is supplied to the instrument panel end of the cylinder through passage 58, another slot 74, passage 59, and line 65. When the movable valve part 73, 75 is shifted another 45 degrees in the same direction, the disc slots 74 will in effect return to the position of Fig. 10 so as again to effect movement of the tray to its extended position.

The aforementioned 45 degree successive movements of the movable valve part 73, 75 are accomplished by successive inward movements of the rod 83 toward the instrument panel 24, each such movement being sufficient for engagement of the button 84 with the retaining nut 86. The pawl and associated end of the actuator rod 83 move to the dotted line position of Fig. 6. In the course of such movement, the head portion 79 of the pawl 78 engages the radial side of a ratchet tooth 76 on the rotor 75 and shifts the movable valve part 73, 75 through 45 degrees. The actuator rod 83 returns to the position shown in Fig. 6 under the action of the spring 87 when released, but the movable valve part 73, 75 does not move backward with the actuator rod, because the frictional engagement between the valve plate 73 and the caps 53 produced by the spring 77 resists such movement and the pawl 78 has sufficient resilience and flexibility to be bent upward and ride over the intervening ratchet tooth 76. The next actuation or movement of the actuator rod 83 toward the instrument panel 24 produces another 45 degree shift of the movable valve part 73, 75.

From the foregoing description and reference to the drawings, it may be readily understood that we have provided a utility tray structure adapted to use in automobiles and the like, and wherein the structure and arrangement provides for successive movements of the tray between extended and retracted positions by successive manual operations of a push-button type of control.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States is:

1. A slidable support for a tray or the like comprising a fixed frame including tubular guides, a transverse support connecting said guides and holding said guides with their axes in parallel relationship, a movable frame including rods extending into said tubular guides and having substantially parallel axes such that the rods may be reciprocated in the guides, a transverse support connecting said guides and holding said guides in parallel relationship as aforesaid, a third tubular guide secured to the first mentioned transverse support, tray supporting means slidable on said third guide, tray supporting means on the second mentioned transverse support, and pressure differential operated means disposed within the third guide and connected to the movable frame, whereby to move the movable frame relative to the fixed frame and thus to slide the tray on its fixed supporting frame.

2. A slidable support as described in claim 1, said pressure differential operated means comprising a cylinder disposed with its axis substantially parallel with the axes of the tubular guides, a piston reciprocable in the cylinder and a piston rod connecting the piston with the movable frame as aforesaid, and the tray supporting means on the third guide substantially encircling the cylinder and being slidable axially thereon.

3. A slidable support as described in claim 1, a second transverse support connecting said guides and spaced from the first mentioned transverse support, said pressure differential operated means including a cylinder disposed with its axis parallel with and midway between the axes of the tubular guides, a piston reciprocable in the cylinder and a piston rod connected to the piston and extending toward the movable frame, said movable frame including a transverse support secured to the ends of the rods removed from the tubular guides, and said piston rod being secured to the transverse support for the movable frame.

References Cited in the file of this patent

UNITED STATES PATENTS

| | | |
|---|---|---|
| 1,486,304 | Ross | Mar. 11, 1924 |
| 2,075,936 | Graehner et al. | Apr. 6, 1937 |
| 2,081,248 | Murphy | May 25, 1937 |
| 2,125,476 | Westrope et al. | Aug. 2, 1938 |
| 2,242,057 | Crzellitzer | May 13, 1941 |
| 2,253,112 | DeBoysson | Aug. 19, 1941 |
| 2,322,755 | Voorhies | June 29, 1943 |
| 2,443,381 | Farrar, Jr. | June 15, 1948 |
| 2,472,675 | Mueller | June 7, 1949 |
| 2,473,507 | Bullard | June 21, 1949 |
| 2,499,993 | Cregg | Mar. 7, 1950 |
| 2,520,455 | Clachko | Aug. 29, 1950 |
| 2,526,879 | Kizaur | Oct. 24, 1950 |
| 2,568,236 | Kizaur | Sept. 18, 1951 |
| 2,616,775 | Nesbitt et al. | Nov. 4, 1952 |